United States Patent Office 3,058,828
Patented Oct. 16, 1962

3,058,828
FOOD SUPPLEMENT COMPOSITION
Robert L. Lindblad, 2457 Elm St., Salt Lake City, Utah
No Drawing. Filed Sept. 27, 1960, Ser. No. 58,628
3 Claims. (Cl. 99—23)

This invention relates generally to concentrated foodstuffs and in particular to a new composition of matter providing a food supplement adapted for use in survival or other situations in which a normal diet of food is not available.

The use of specially prepared concentrated foods, natural or synthetic, to supplement or temporarily substitute for a normal diet is well known. A great deal of work has heretofore been done in this field mostly directed to preparation of either a concentrate useful in emergency situations to stave off fatal starvation or a more deluxe ration, only relatively concentrated, for use as a light weight supply of food for hunters and the like. In the former class fall the extremely concentrated materials, commonly fortified or supplemented with vitamins. The latter class comprises primarily dehydrated materials requiring the addition of heat and water to furnish a palatable portion.

The present invention is concerned primarily with food stuffs usable in survival or other emergency situations such as in the first class mentioned above. However, the food stuff of the invention is designed to sustain human life over an extended period without undue strain on health or body and additionally to be so palatable as to be adapted for use in lieu of the more luxurious diets of the second class.

It is, therefore, a primary object of this invention to provide a lightweight food supplement capable of sustaining life over a relatively extended period without deleterious effect on any of the bodily functions.

A second object is to provide such food supplement in a form that resists deterioration over lengthy periods, up to decades, to the end that a permanent store of emergency rations may be provided.

A further and extremely important object is the provision of a food supplement as described above that is palatable in either a dry or wet form without change in its beneficial characteristics.

Necessarily related to the above objects is the still further object of providing a food supplement that supplies the basic bodily requirements as to protein, chewing, bowel activation and caloric intake; and at the same time is capable of having mixed therewith without change in either its chemical or physical characteristics, desirable vitamin bearing concentrates.

As this specification proceeds, other objects and advantages will become apparent to those skilled in the field to which this invention pertains.

In its broadest aspect, this invention attains the foregoing objects by the provision of a food supplement containing as basic elements, in carefully regulated critical proportions, animal protein, sugar, methylcellulose, non-fat dry milk substance and flavoring.

Protein is provided in a minimum amount to satisfy bodily protein needs and additionally at least 10% of bodily caloric needs.

Sugar is provided for the obvious reason of its caloric content and in a dry form to prevent introduction of moisture into the mixture in quantities deleterious to other ingredients of the complete supplement.

Methylcellulose is provided in an amount sufficient to provide a chewable substance in dry form and as a nutrient and primarily a filler in either wet or dry form. Additionally the hydroscopic nature of this substance aids in keeping the other ingredients in dry form and prevents caking.

The non-fat dry milk solids provide calcium as well as enriching the general mixture.

Flavoring is supplied for the obvious reason of contributing to palatability and additionally as a vehicle for combined sugar, salt, lecithin, color and certain vitamins. In a preferred embodiment, the flavoring is processed cocoa which, gives the important additional advantage of providing bowel stimulation.

As previously noted, concentrated food supplements are known; and the use of one or more of the above listed ingredients in various random mixtures is known. However, in all prior mixtures palatability and longevity of the mixture has not been all that is desired. For instance, a mixture carrying too much protein simply cannot be partaken, particularly in dry form, over any extended period because it becomes a sticky mess that coats the mouth. This problem is even more acute in situations where water is unavailable as a diluent or vehicle for the food. Attempts to improve palatability by adding moisture to the mixture result in little increase in palatability but contribute a marked decrease in keeping quality due to the propensity of proteinaceous material to disintegrate in the presence of moisture.

Granulated sugar in the pure state acts only as a sweetener hence can be taken in any quantity suitable to individual taste. However, when combined in the supplement of the present mixture, must be maintained within careful limits. Otherwise, for reasons unknown to me, it renders the mixture unpalatable.

Methylcellulose is a synthetic gum noted for its bulk and solubility in water. This substance is frequently used in small dosages as a laxative and also as a vehicle for external medicants. However, it is not generally regarded as edible and in the pure state is almost physically unpalatable due to its tendency to jell when warmed as occurs when eaten dry. With powdered animal protein matter, the result is a mixture that simply cannot be swallowed especially when the palate is dry as often occurs under survival conditions.

Chocolate flavoring follows much the same pattern as methylcellulose insofar as palatability is concerned.

Non-fat milk solids are a necessary ingredient due to protein and calcium content, but they are themselves highly unpalatable in the dry state and only difficultly palatable when dissolved in water as a sole drink over an extended period. Moreover, this ingredient does not furnish much in the way of nutrient beyond calcium.

From the preceding discussion it is evident that the present invention of a long-keeping, palatable food supplement depends not only upon the provision of certain ingredients, but also on providing such ingredients in certain proportions and in a particular physical state.

During development of my food supplement extensive experiments were conducted and its was through them that my discovery was made that if, in addition to a quantity of items sufficient to meet nutritional requirements, there was provided a certain proportion of ingredients therebeyond, the mixture could be rendered palatable.

Obviously, there may be various grades of each of the ingredients. However, my formula is based on the use of chemically pure or acceptable commercial substances of types available on the market. Illustration of this is found in the following example of a highly successful food supplement.

A food suppliment was prepared using the indicated ingredients and proportions.

| | Percent |
|---|---|
| (1) Animal protein (sodium caseinate), 90% protein, 4% ash, 1.5% fat, 1.3% Na, 0.2% inerts and 3% moisture at a particle size of 100% minus 120 (Tyler) mesh | 10–16 |
| (2) Methylcellulose—Chemically pure substance such as Dow Chemical Co. U.S.P. grade marketed under the trademark Methocel MC | 8–13 |
| (3) Granulated sugar-commercial grade | 27–33 |
| (4) Chocolate flavor mix including sugar, cocoa processed with alkali, artificial and natural flavors, lecithin, salt and color (such as Baker's instant chocolate) | 24–29 |
| (5) Non-fat dry milk solids | 26–32 |

The relative proportions set forth above are important. Obviously, one may be increased in absolute quantity without detriment to the nutritional value of the mixture. However, the stated proportions cannot be materially changed on more than one ingredient without rendering the mixture unpalatable and seriously impairing its usefulness as a food supplement.

Tests on actual subjects, prove that while any single ingredient can be increased as much as about 50% without harmful effect no more than one ingredient can be increased beyond a maximum of 5% beyond the top of the range stated without destroying palatability. Thus, the food supplement composition of the invention requires that if any one of the ingredients exceeds the range by more than 5% then the remaining four must be kept within the specified range; and further that no two ingredients be increased more than 5% above the stated range in any given mix.

Having mixed the ingredients in proper proportions, it is advantageous to package the mix into convenient size packets for handling. I have found it preferable to provide packets containing one-half the daily adult nutritional requirements. Using the mix in the proportions set forth above, a packet containing the one-half daily requirement weighs only 37 grams. Thus two packets, or a full day's needs would weigh only 74 grams.

Vitamin concentrates to supply established minimum daily requirements can either be mixed with the food supplement or taken separately. Such vitamins will not increase the weight of any single packet more than 1–2 grams depending on the exact vitamin compounds utilized.

The prepared mix is packaged in small polyethylene bags to protect it from attack by the elements.

In an actual test under severe conditions a food supplement was prepared containing 11.6% animal protein as described, 8.41% methylcellulose as described, 28.1% granulated sugar, 24.8% instant chocolate, and 27% non-fat dry milk solids. The supplement composition was put up in 37 gram packets each of which was fortified with the following in the amounts stated thus bringing each packet to a total weight of about 39 grams.

Vitamin A 8000 units, vitamin $B_1$ (thiamine HCl) 2 mg., vitamin $B_2$ (riboflavin) 4 mg., vitamin $B_6$ (pyridoxine HCl) 0.5 mg., vitamin $B_{12}$ activity (cobalmin conc.) 2 mcg., choline bitartrate 20 mg., methionine 20 mg., para aminobenzoic acid 10 mg., inositol 6 mg., calcium pantothenate 2 mg., niacinamide 20 mg., vitamin C (ascorbic acid) 60 mg., vitamin D (irr. ergost.) 2000 units., vitamine E (alpha-tocoph. acetate) 6 mg., calcium (bone meal) 170 mg., phosphorous (bone meal) 77 mg., iodine (pot. iodide) 0.2 mg. cobalt (cobalt sulfate) 0.2 mg., iron (ferric citrate) 20 mg., copper (copper sulfate) 1 mg., fluorine (bone meal) 200 mcg.

The subject was provided with only 15 packets and additionally carried 15 caloric bars of 4 oz. each. No other food substance was provided. Additional equipment included a basic first aid kit, knife, 4 oz. soap, matches, fishing kit and 20 feet of rope. The entire set-up weighed about 6½ pounds of which only 6 pounds was food.

Subject was given a thorough supervised physical examination then, with only the above food material and equipment, was parachuted into mountainous wilderness area where he lived on the kit for 15 days during which time he traveled over 160 miles to a rendezvous point. The subject was immediately given a second supervised physical examination and the contents of the kit checked.

The physical examination showed the subject to be in excellent condition both before and after the test and to have lost only 12 pounds from a starting weight of 161 pounds.

A check of the kit showed that subject had used both the 15 food supplement packets and the 15 caloric bars. Aside from water he had partaken of no other food. Every food supplement packet was eaten dry rather than being dissolved in water.

From the foregoing it is apparent that the composition of my invention provides a superior food supplement having superior nutritional values and providing the all important element of palatability.

Having thus described my invention what I desire to claim and secure by Letters Patent is:

1. A composition of matter forming a food supplement comprising in dry mixture at least 10% by weight animal protein, 8% by weight methylcellulose, 27% by weight granulated sugar, 24% by weight processed cocoa and 26% by weight non-fat dry milk solids, and not more than an additional 10% of not more than two of said substances.

2. A composition of matter forming a food supplement, comprising in dry mixture and in the given by weight proportional ranges at least three of the five substances consisting of animal protein in amount of 10% to 16%; methylcellulose in amount of 8% to 13%; granulated sugar in amount of 27% to 33%; processed cocoa in amount of 24% to 29%; and non-fat dry milk solids in amount from 26% to 32%; and the remaining two of said substances do not exceed their respective upper proportional ranges by more than 5% of said upper limit.

3. A composition of matter forming a food supplement comprising in dry mixture by weight 10% to 16% animal protein containing less than 4% by weight moisture, 8% to 13% methylcellulose, 27% to 33% granulated sugar, 24% to 29% processed cocoa, and 26% to 32% non-fat dry milk solids.

References Cited in the file of this patent

UNITED STATES PATENTS

| | | |
|---|---|---|
| 1,943,374 | Dreyfus | Jan. 16, 1934 |
| 2,176,086 | Logan | Oct. 17, 1939 |
| 2,225,506 | Otting | Dec. 17, 1940 |
| 2,421,598 | Buxton | June 3, 1947 |
| 2,738,277 | Cryns | Mar. 13, 1956 |